United States Patent Office 3,068,046
Patented Dec. 11, 1962

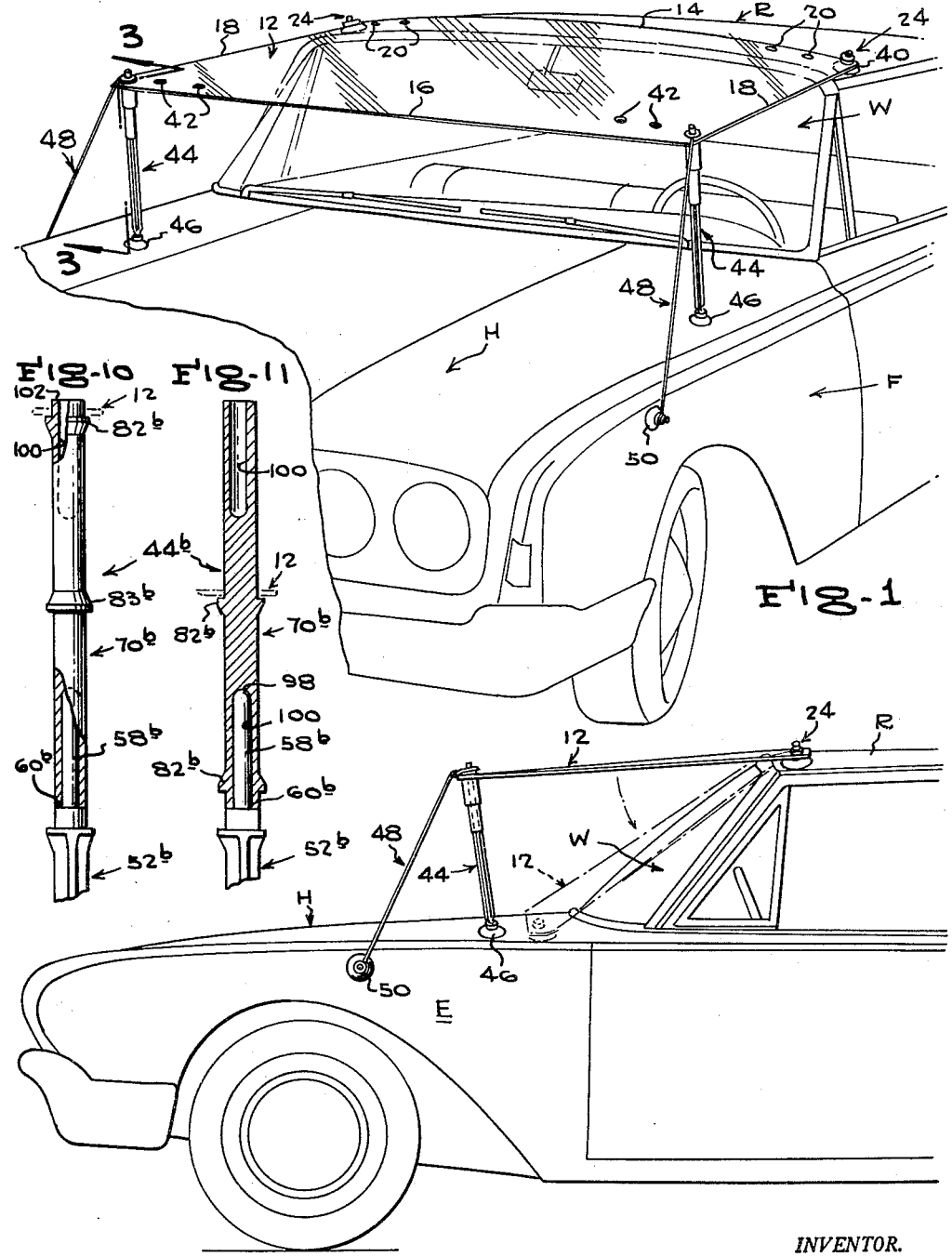

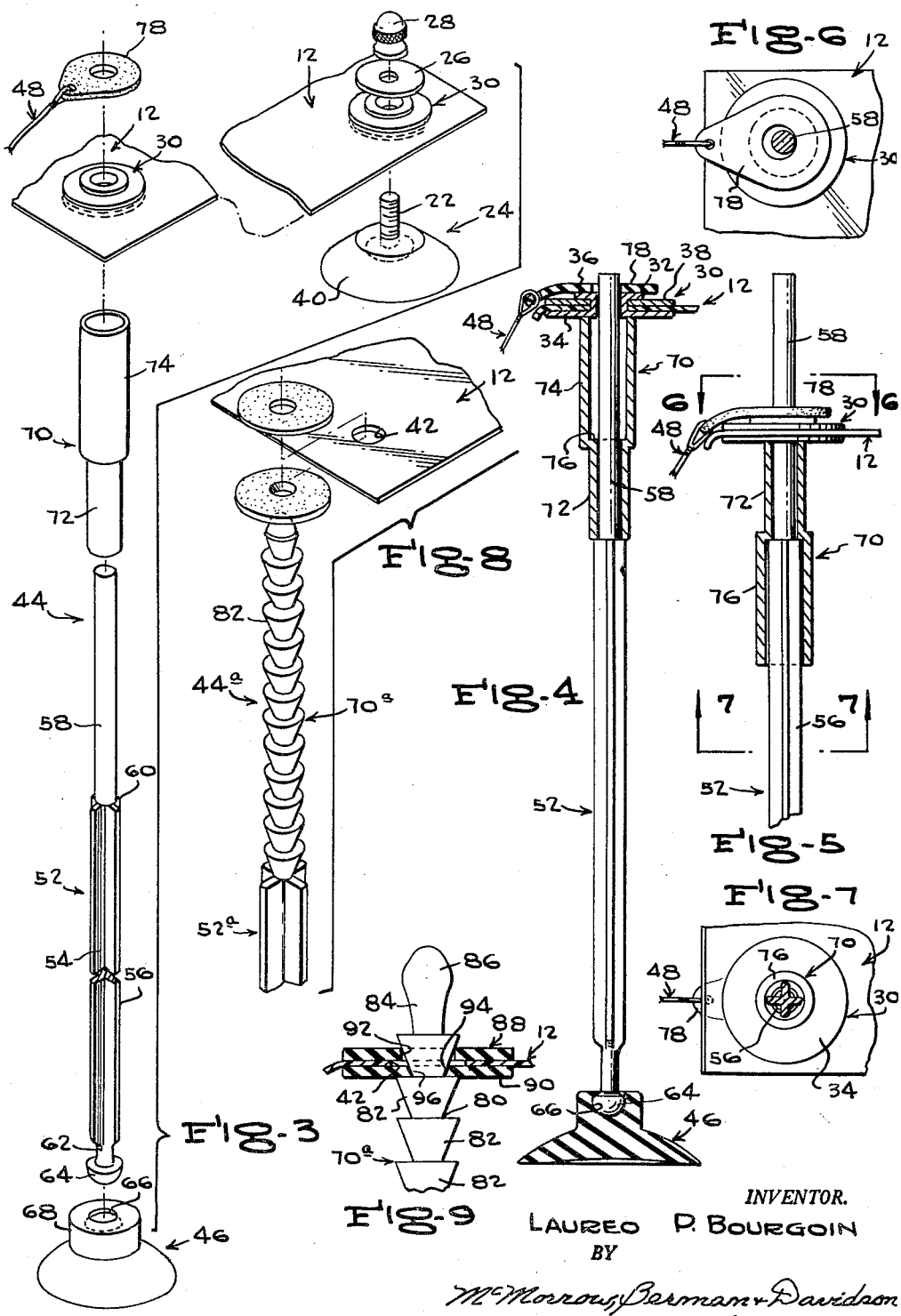

3,068,046
AUTOMOBILE WINDSHIELD AWNING
Laureo P. Bourgoin, 9 Cedar Court, Amesbury, Mass.
Filed Apr. 21, 1961, Ser. No. 104,751
7 Claims. (Cl. 296—95)

This invention relates to a novel awning for automobile windshields which keeps rain and snow from obscuring windshields while the automobiles are parked, as in drive-in outdoor movie theaters.

The primary object of the invention is the provision of efficient and easily installed knockdown awnings of the kind indicated, which are adjustable to fit substantially all passenger automobiles, and which when knocked down can be made into relatively small and compact bundles for convenient storage in automobiles.

Another object of the invention is the provision of simple awnings of the character indicated above, which are composed of a minimum number of simple and easily assembled parts, and which can be mass-produced in serviceable and attractive forms of a variety of readily available materials, at relatively low cost, within reach of the average drive-in theater patron.

A further object of the invention is the provision of awnings of the character indicated above, which involve awning panels, means for securing the panels, at their rear edges, upon the roofs of automobiles, props for supporting the panels, at their forward edges upon the fenders thereof, and tie cords adapted to be secured to the props and the fenders for holding the props upright, the panels being provided with spaced holes for selectively receiving the securing means and the props, so as to accommodate the awnings to automobiles of different shapes and dimensions.

Still another object of the invention is the provision, in awnings of the character indicated above, of sectional props which are vertically adjustable for determining the height of the front edge of the awning panels above automobile fenders and hoods, and of non-sectional props wherein the panels are vertically adjustable along such props, for the same purposes.

Other important objects and advantageous features of the invention will become apparent from the following description and the accompanying drawings, wherein, for purposes of illustration only, a specific form of the invention is set forth in detail.

In the drawings:

FIGURE 1 is a fragmentary perspective view showing an awning installed on an automobile in accordance with the present invention;

FIGURE 2 is a side elevation of FIGURE 2, which includes phantom lines showing the awning panel removed from its props and secured in declining position along the windshield;

FIGURE 3 is an enlarged and contracted exploded perspective view of the props and panel securing means of FIGURES 1 and 2, in relation to fragmentary portions of the panel;

FIGURE 4 is a side elevation of the sectional prop of FIGURE 3, upper and lower components thereof being shown in vertical section;

FIGURE 5 is a fragmentary view like FIGURE 4, showing the upper section reversed on the lower section, for reducing the overall height of the prop;

FIGURES 6 and 7 are horizontal sections taken on the lines 6—6 and 7—7, respectively, of FIGURE 5;

FIGURE 8 is a fragmentary and exploded sectional view of a non-sectional prop;

FIGURE 9 is an enlarged and fragmentary view of the upper part of the prop of FIGURE 8, showing retaining rings and a part of a panel in vertical section, and in adjusted section thereon;

FIGURE 10 is a fragmentary side elevation, on a reduced scale of a further form of sectional prop, portions of whose upper section are broken away and in cross section; and, FIGURE 11 is a view like FIGURE 10, wherein the upper section is reversed on the lower section for reducing the overall height of the prop, the upper section being shown in longitudinal cross section.

Referring in detail to the drawings, wherein like and related numerals designate like and related parts throughout the several views, and first to FIGURES 1 through 7 thereof, an automobile is shown which has a windshield W slanting downwardly from a roof R, to an engine hood H, on opposite sides of which are fenders F.

The illustrated awning comprises a normally flat, transversely elongated, rectangular awning panel 12 having a rear edge 14, a front edge 16, and side edges 18. The panel 12 is of self-supporting rigidity, but is flexible and resilient enough to permit of its being rolled into a compact bundle for storage. At the rear corners of the panel 12 are provided, along its rear edge 14, pluralities of spaced holes 20, to selectively receive the upstanding threaded shanks 22 of suction cup panel securing devices 24, which include washers 26, and clamping cap nuts 28. The holes 20 preferably are guarded by grommets 30 which reinforce the panel 12 and provide secure and non-injurious purchase for the nuts and the washers. As shown in FIGURE 4, the grommets 30 preferably comprise vertical sleeves 32 on which are vertically spaced lower and upper annular flanges 34 and 36, the upper flanges being smaller in diameter than the lower flanges. Spacer washers 38 are circumposed on the sleeves 32 between the upper flanges 36 and the top of the panel 12, with the lower flanges 34 engaged with the underside of the panel. Two of the securing devices 24 are used to secure the panel 12, at its rear edge, upon the top of the automobile roof R, with the suction cups 40 of the devices secured upon the top of the roof R, preferably at points located laterally outwardly of the sides of the windshield W.

The awning panel 12 is provided, along its front edge 16, at the forward corners of the panel, with pluralities of spaced holes 42 to receive the upper ends of props 44 which have suction cups 46, on their lower ends, which are adapted to be secured upon the upper surfaces of the fenders F. Tie-down cords 48, which can be stretchable and elastic or gauged in length to be under tension, when in use, extend forwardly, downwardly, and laterally outwardly from the upper ends of the props 44, above the awning panel 12, and are secured, at their lower ends, to suction cups 50, which are secured to the laterally outward sides of the fenders F.

The props 40, as shown in FIGURES 3 through 7, comprise lower sections 52, which are longitudinally fluted, as indicated at 54, to provide rigid cruciform cross intermediate portions 56. Reduced diameter cylindrical upper portions 58 are on the upper ends of the intermediate portions 56, which, with the intermediate portions, define shoulders 60. On the lower ends of the intermediate sections 56 are short reduced diameter shanks 62 which terminate, at their lower ends, in enlarged diameter hemispherical heads 64, which engage securably within sockets 66, provided in the tops of the upstanding bosses 68 of the suction cups 46. The props 44 have upper sections 70 which comprise smaller diameter lower tubes 72 and larger diameter upper tubes 74, at the meetings of which internal shoulders 76 are defined. The upper prop sections 70 are shorter than the upper portions 58 of the lower prop sections 52, so that, as shown in FIGURES 4 and 5, the upper portions 58 extend above the upper sections 70, and upwardly through and above grommets 30 surrounding holes 42 at the front edge of the awning panel 12.

As shown in FIGURE 5, the overall height of the props 44 can be reduced, by reversing the upper sections 70, so that their larger tubes receive the upper ends of the intermediate portions 56 of the lower sections 52 and the smaller tubes 72 receive the upper portions 58 of the lower sections, the shoulders 60 and 76 being engaged.

The tie-down cords 48 have flexible rings 78, on their upper ends, which engage over the upper portions 58 of the lower prop sections, above the grommets 30, about the awning panel 12, and have the suction cups 50, in their lower ends.

In FIGURES 8 and 9, is shown a non-sectional form of prop 44a wherein the upper sections 70a are integral with their lower sections 52a. The lower sections 52a are similar to the lower sections 52 of the props 44 of FIGURES 1 through 7. The upper sections 70a, however, are substantially different from their counterparts of the props 44. The upper sections 70a are formed with longitudinally spaced annular notches 80, which define upwardly flaring conical beads 82, of a diameter to pass through the front edge holes 42 of the awning panel 12, or through grommets 30. The uppermost beads 82 are surmounted by upstanding studs having shanks 84 and enlarged diameter heads 86, over which the rings 78 on the upper ends of tie-down cords 48 are adapted to be engaged.

Vertical adjustability of the front edge of the awning panel 12, relative to the upper sections 70a of the props 44a, is provided by the provision of resilient upper and lower washers 88 and 90, respectively, to engage the upper and lower surfaces of the panel 12 around the front edge panel holes 42, as shown in FIGURE 9. The upper washers 88 have center openings 92 large enough to pass the beads 82, with slight expansion of the openings 92. The lower washers 90 have central openings 94 which are substantially smaller in diameter than the beads 82, and have upwardly flared edges 96 which conform to the upward flare of the beads. This arrangement requires forcible movements of the lower washers 90, in order to engage them between selected beads 82, for the purpose of adjusting the overall height of the props 44a, and assures that, once so placed, the lower washers will not shift down along the props 44a, from their adjusted positions.

Another form of sectional prop 44b is shown in FIGURES 10 and 11, which involves separable lower and upper sections 52b and 70b. The lower sections 52b are substantially similar to the lower sections 52 of the props 44 of FIGURES 1 to 7, except that their upper portions 58b are shorter and have rounded upper ends 98. The upper sections 70b are solid cylindrical rods which have similar blind bores 100, on their upper and lower ends, which are of a length to conformably receive the upper portions 58b of the lower section 52b, in reversed positions of the upper section 70b.

The diameter of the upper section 70b is substantially the same as the upper portions 58 of the lower sections 52 of the props of FIGURES 1 to 7, so as to be receivable through the front edge holes 42 of the awning panel 12. The upper section 70b has, as shown in FIGURE 10, an upper shoulder or bead 82b, located close to its upper end 102, and an intermediate shoulder or bead 83b, located intermediate its ends, and reversed with respect to the upper bead 82b. In the arrangement shown in FIGURE 10, and with the awning panel supported on the upper bead 82b, the prop 44b provides maximum height positioning of the panel 12. In the arrangement shown in FIGURE 11, wherein the upper sections 70b is reversed on the lower section 52b, and the panel rests upon the intermediate bead 83b, the prop 44b provides minimum height adjustment of the panel.

As shown in phantom lines in FIGURE 2, with the props 44 removed, the awning panel 12 can be placed down along the windshield W so as to protect the windshield from rain or snow, while the automobile is parked, in which case, securing devices 24 can be installed through front edge holes 42 of the panel 12, and secured to the hood H, near the windshield, to hold the panel down in place.

Although there have been shown and described herein preferred forms of the invention, it is to be understood that the invention is not necessarily confined thereto, and that any change or changes in the structure of and in the relative arragements of components thereof are contemplated as being within the scope of the invention as defined by the claims appended hereto.

What is claimed is:

1. In combination, an automobile having a hood, fenders at opposite sides of the hood, a windshield extending upwardly at the rear end of the hood, and a roof positioned above and extending rearwardly from the top of the windshield, an awning panel extending forwardly from the roof above the windshield and spaced upwardly from the hood and the fenders, said panel having front and rear edges and side edges, securing means securably engaged upon the roof and securing the rear edge of the panel on the roof behind the windshield, vertical props having lower ends flexibly secured upon the hood and upper ends secured to the panel at its front edge, and stretched tie-down cords having upper ends secured to the upper ends of the props and lower ends secured to the fenders at locations forwardly of the props, said props being vertically adjustable, and comprising separable telescoped upper and lower sections, the upper sections being reversible on the lower sections and having portions spaced therealong, at different distances from one end thereof upon which the awning panel can bear.

2. In combination, an automobile having a hood, fenders at opposite sides of the hood, a windshield extending upwardly at the rear end of the hood, and a roof positioned above and extending rearwardly from the top of the windshield, an awning panel extending forwardly from the roof above the windshield and spaced upwardly from the hood and the fenders, said panel having front and rear edges and side edges, securing means securably engaged upon the roof and securing the rear edge of the panel on the roof behind the windshield, vertical props having lower ends secured upon the hood and upper ends secured to the panel at its front edge, and stretched tie-down cords having upper ends secured to the upper ends of the props and lower ends secured to the fenders at locations forwardly of the props, said props being vertically adjustable, said props having integral upper and lower sections, the upper sections having vertically spaced annular grooves defining upwardly flaring beads therebetween, the awning panel having openings through which the upper prop sections pass, resilient washers surrounding the openings and secured to the panel, said washers having center holes adapted to be deformed to pass the washers over beads into selected grooves for supporting the panel at adjusted heights.

3. In combination, an automobile having a hood, fenders at opposite sides of the hood, a windshield extending upwardly at the rear end of the hood, and a roof positioned above and extending rearwardly from the top of the windshield, an awning panel extending forwardly from the roof above the windshield and spaced upwardly from the hood and the fenders, said panel having front and rear edges and side edges, securing means securably engaged upon the roof and securing the rear edge of the panel on the roof behind the windshield, vertical props having lower ends flexibly secured upon the hood and upper ends secured to the panel at its front edge, and stretched tie-down cords having upper ends secured to the upper ends of the props and lower ends secured to the fenders at locations forwardly of the props, said props being vertically adjustable, and comprising separable upper and lower sections, the upper sections being reversible on the lower sections and having portions spaced therealong at different distances from ends thereof upon which the awning panel can bear, the lower sections having reduced diameter upper portions having shoulders at their lower ends, said upper sections comprising enlarged diameter upper tubes adapted to receive the lower sections and smaller diameter tubes for receiving the upper portions of the lower sections, the meeting of the tubes defining internal shoulders adapted to rest upon the lower section shoulders in reversed positions of the upper sections wherein the awning panel is supported on the then upper end of the smaller tube, from a position in which the smaller tubes rest on the lower section shoulders and the awning panel rests upon the then upper end of the larger tube.

4. In combination, an automobile having a hood, fenders at opposite sides of the hood, a windshield extending upwardly at the rear end of the hood, and a roof positioned above and extending rearwardly from the top of the windshield, an awning panel extending forwardly from the roof above the windshield and spaced upwardly from the hood and the fenders, said panel having front and rear edges and side edges, securing means securably engaged upon the roof and securing the rear edge of the panel on the roof behind the windshield, vertical props having lower ends flexibly secured upon the hood and upper ends secured to the panel at its front edge, and stretched tie-down cords having upper ends secured to the upper ends of the props and lower ends secured to the fenders at locations forwardly of the props, said props being vertically adjustable, and comprising separable upper and lower sections, the upper sections being reversible on the lower sections and having portions spaced therealong at different distances from ends thereof upon which the awning panel can bear, said lower sections having reduced diameter upper portions having shoulders at their lower ends, said upper sections comprising rods having first and second ends to which axial blind bores open for receiving the upper portions of the lower sections, said upper sections having upper external shoulders at their first ends for supporting the awning panel at maximum height, and external intermediate shoulders for supporting the panel at a lower height.

5. In combination, an automobile having a hood, fenders at opposite sides of the hood, a windshield extending upwardly at the rear end of the hood, and a roof positioned above and extending rearwardly from the top of the windshield, an awning panel extending forwardly from the roof above the windshield and spaced upwardly from the hood and the fenders, said panel having front and rear edges and side edges, securing means securably engaged upon the roof and securing the rear edge of the panel on the roof behind the windshield, vertical props having lower ends flexibly secured upon the hood and upper ends secured to the panel at its front edge, and stretched tie-down cords having upper ends secured to the upper ends of the props and lower ends secured to the fenders at locations forwardly of the props, said securing means comprising suction cups secured on the roof and having upstanding shanks, the panel being provided with holes along its rear edge through which the shanks are engageable, and nuts on the shanks above the panel.

6. In combination, an automobile having a hood, fenders at opposite sides of the hood, a windshield extending upwardly from the hood, and a roof located at the upper end of the windshield, an awning panel spaced above and extending forwardly over the hood and secured at its rear edge upon the roof, and vertically adjustable props having lower ends secured upon the hood and upper ends secured to the panel at the forward edge thereof, said props comprising upper sections telescoped on lower sections and being reversible relative thereto, said lower sections having reduced diameter upper end portions having shoulders at their lower ends, said upper sections having blind bores opening to their upper and lower ends, the reduced upper portions of the lower sections being selectively engageable in said blind bores, said upper portions having first shoulders intermediate their ends and second shoulders located near one end thereof upon which the panel can bear at different elevations above the hood.

7. In combination, an automobile having a hood, fenders at opposite sides of the hood, a windshield extending upwardly from the hood, and a roof located at the upper end of the windshield, an awning panel spaced above and extending forwardly over the hood and secured at its rear edge upon the roof, and vertically adjustable props having lower ends secured upon the hood and upper ends secured to the panel at the forward edge thereof, said props comprising upper sections telescoped on lower sections and being reversible relative thereto, said lower sections having reduced diameter upper end portions having shoulders at their lower ends, said upper sections being tubular and having small diameter end portions adapted to receive the upper end portions of the lower sections and enlarged diameter end portions adapted to receive the main portions of the lower sections, in reversed positions of the upper sections, said upper sections having internal shoulders adapted to rest upon the shoulders of the lower sections, the then upper ends of the upper sections being supportably engaged with the awning panel.

References Cited in the file of this patent

UNITED STATES PATENTS

| | | |
|---|---|---|
| 1,014,393 | Hermann | Jan. 9, 1912 |
| 1,610,305 | Muncie | Dec. 14, 1926 |
| 2,064,393 | Talbott | Dec. 15, 1936 |
| 2,293,883 | Bossert | Aug. 25, 1942 |
| 2,368,692 | Wallance | Feb. 6, 1945 |
| 2,437,845 | Wyeth | Mar. 16, 1948 |
| 2,679,255 | Stafford | May 25, 1954 |
| 2,804,633 | Taylor et al. | Sept. 3, 1957 |
| 2,843,421 | Shelton | July 15, 1958 |
| 2,944,601 | Compson | July 12, 1960 |
| 2,989,339 | Southall | June 20, 1961 |